(No Model.)
F. C. COOPER.
METHOD OF DELINTING COTTON SEED.
No. 389,739. Patented Sept. 18, 1888.
3 Sheets—Sheet 1.
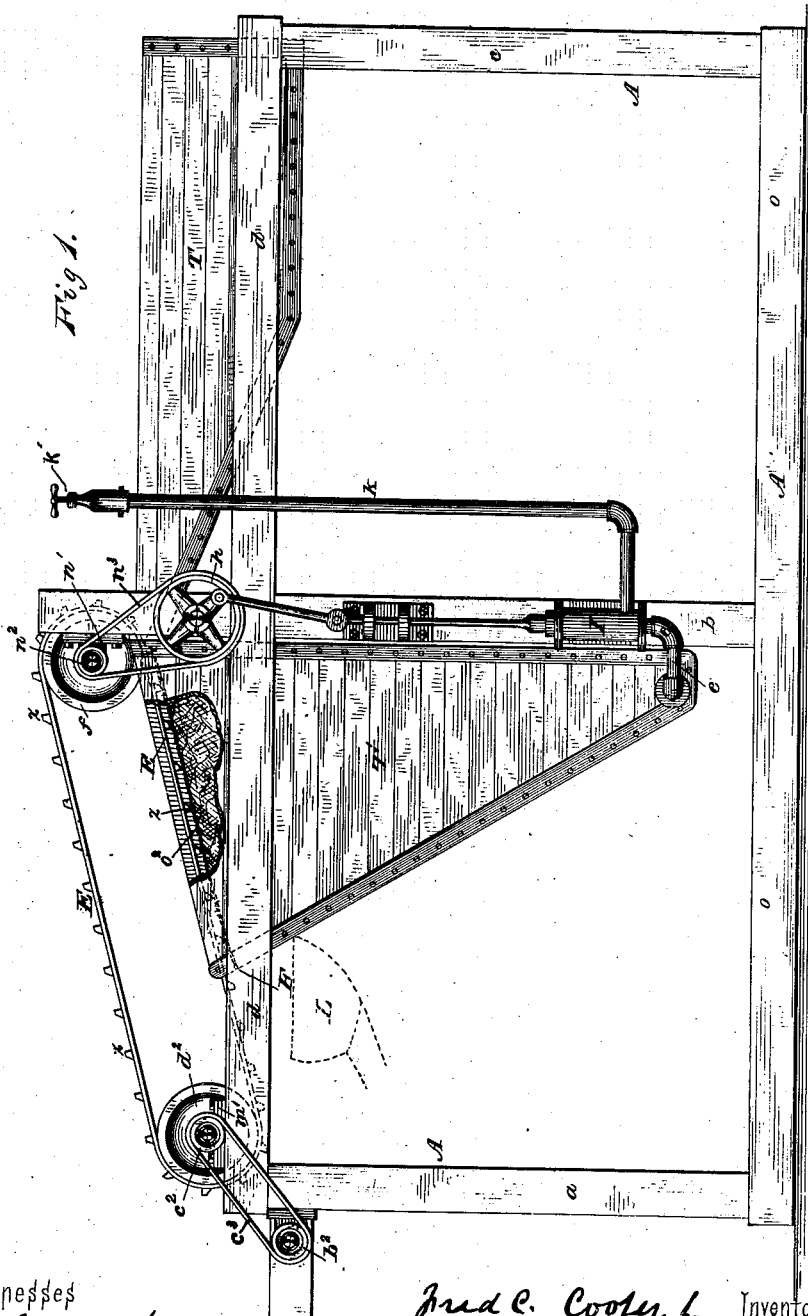
Witnesses
Harry King
Geo. W. Sues
Fred C. Cooper, by
J. J. Darlington,
Attorney.
Inventor.

(No Model.)  F. C. COOPER.  3 Sheets—Sheet 2.
METHOD OF DELINTING COTTON SEED.
No. 389,739.  Patented Sept. 18, 1888.
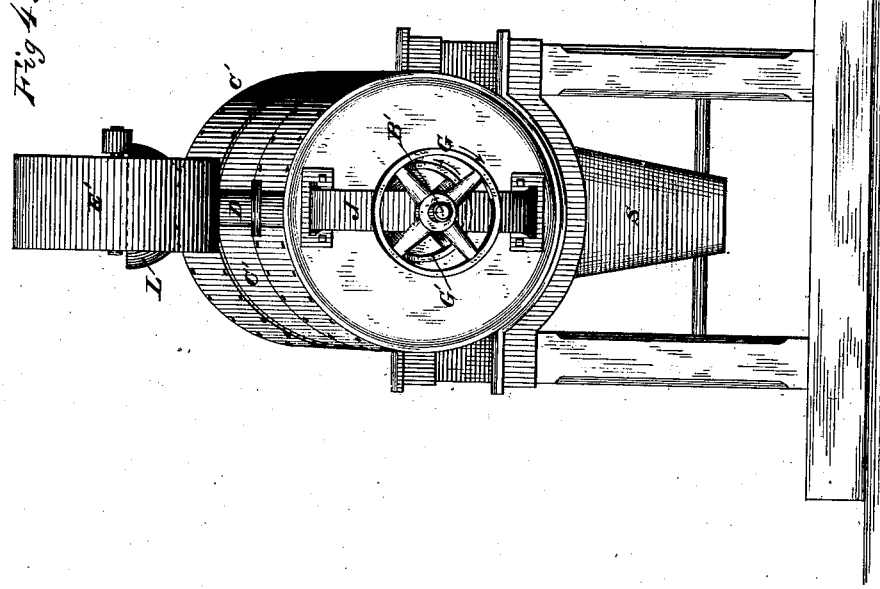
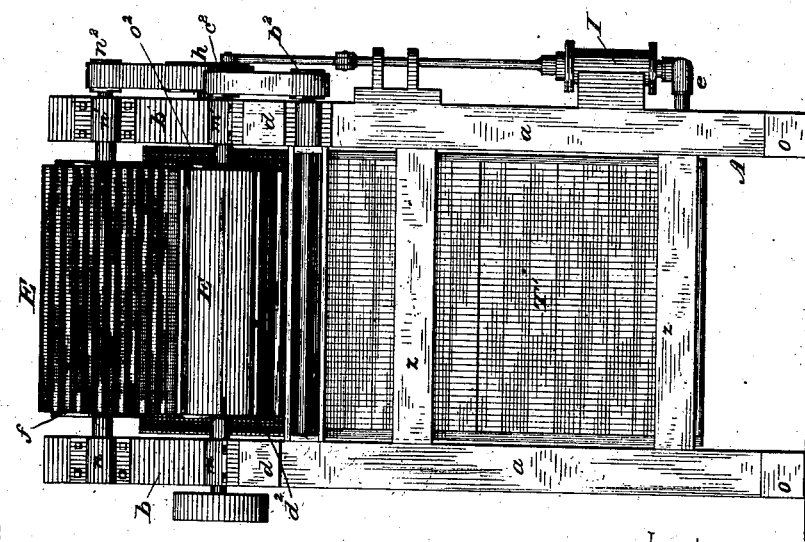

(No Model.) 3 Sheets—Sheet 3.
F. C. COOPER.
METHOD OF DELINTING COTTON SEED.
No. 389,739. Patented Sept. 18, 1888.
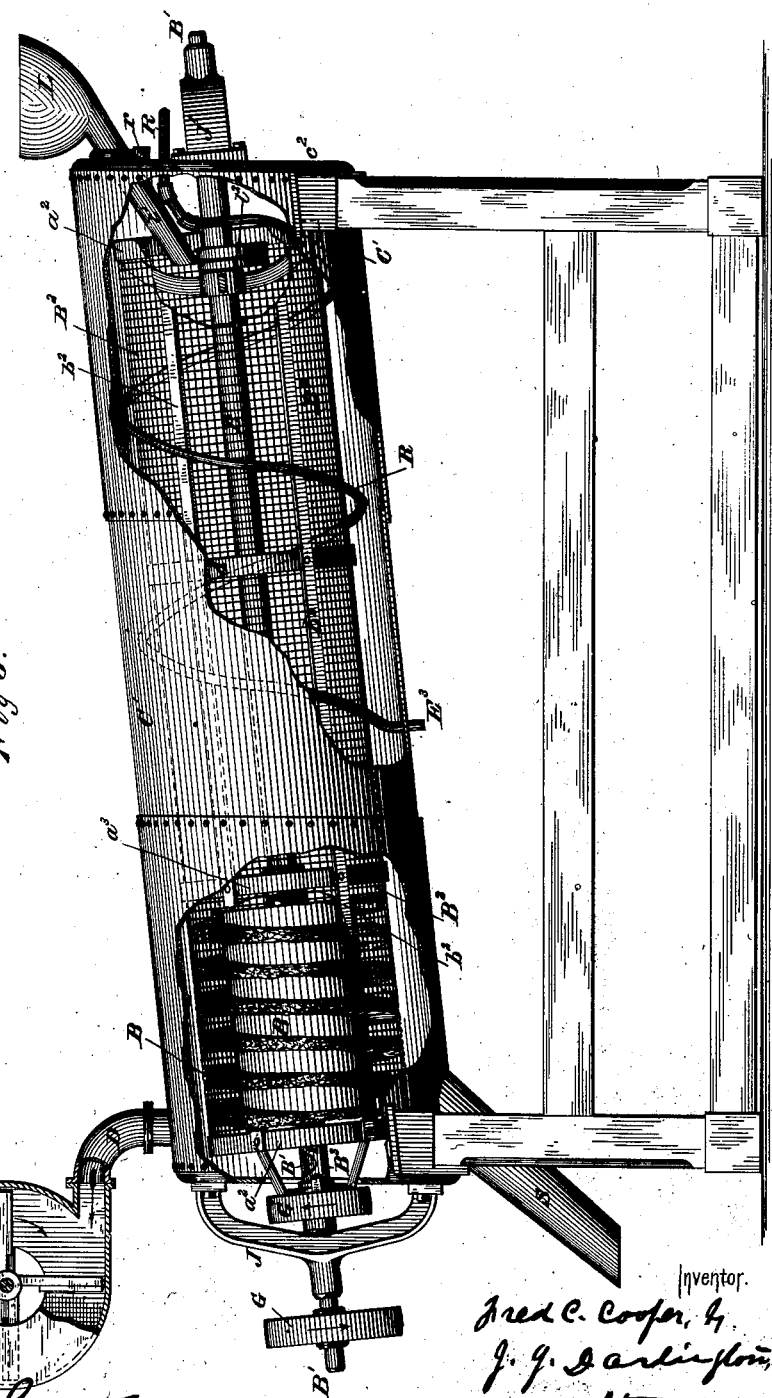

UNITED STATES PATENT OFFICE.

FRED C. COOPER, OF ROME, GEORGIA.

METHOD OF DELINTING COTTON-SEED.

SPECIFICATION forming part of Letters Patent No. 389,739, dated September 18, 1888.

Application filed October 7, 1885. Serial No. 179,248. (No model.)

*To all whom it may concern:*

Be it known that I, FRED C. COOPER, a citizen of the United States, residing at Rome, in the county of Floyd and State of Georgia, have invented certain new and useful Improvements in Methods of Delinting Cotton-Seed, of which the following is a specification, reference being had therein to the accompanying drawings.

Sulphuric acid has been heretofore generally used for removing the fiber or lint from cotton-seed. This powerful reagent is apt to injure the seed by destroying its germinating property, and after subjecting the seed to this acid it requires to be subjected to the action of an alkaline solution to neutralize the acid, and subsequently to a water-bath to remove the salts.

The object of this invention is to avoid injury of the seed and simplify the process by dispensing with the alkaline and water baths.

The process consists, principally, in moistening the seed with a dilute solution of nitric and hydrochloric acids, which is inactive upon the seed without the application of heat, and then subjecting the so-moistened seed to a temperature of 100° centigrade, or thereabout, whereby aqua regia is formed and nascent chlorine liberated in direct contact with the fiber or lint of the seed, as hereinafter set forth.

One method of carrying out my process is to mix nitric acid with hydrochloric acid in the proportions of about one part of the former to five of the latter, preferably using an excess of hydrochloric acid over the theoretical combining proportions, it being supposed that this acid is in part vaporized by the heat. To six parts of the mixture thus formed are added about ninety-four parts of water. The seed having the fiber or lint is then immersed in this solution, or the solution may be passed through or filtered upon such linted seed. Owing to the large quantity of water present the solution with which the seed is moistened remains inactive. The so-moistened seed is then subjected to a temperature sufficient to vaporize the water, and the acids then unite and form aqua regia, or nitro-hydrochloric acid, liberating chlorine in direct contact with the fiber or lint of the seed. The chlorine thus liberated disintegrates the fiber without injuring the seed. Before the seed moistened by the dilute solution enters the heated chamber we have by equation: $HNO_3 + 3HCl + Aq. = NOCl + 2Cl + 2H_2O + Aq.$; but, as stated before, owing to the great amount of water ($H_2O$ and Aq.) the acids cannot enter into combination. On the introduction of the element heat into the equation the obstacle is eliminated and the elements unite, the superfluous water passing off in the form of vapor, and an inert substance (nitrosyl chloride) passing off as a gas, and that chlorine, not entering into combination with the cellulose of the seed, also passes off as a gas. It will be seen that no acids or salts remain on the seed to injure the same after the fiber is removed. At the same time that the seed are subjected to the action of heat and the acids they are also subjected to a brushing operation which removes the disintegrated fiber, or the seed may be subjected to the brushing operation after the chemical operation has been completed.

In the accompanying drawings, which illustrate a convenient apparatus for carrying out this improved process, Figure 1 is a side elevation of the seed-moistening apparatus. Fig. 2 is an end elevation thereof. Fig. 3 is a longitudinal elevation, partly in section, of the apparatus in which the moistened seed is subjected to the action of heat and also to the brushing operation; and Fig. 4 is an end elevation of the apparatus shown in Fig. 3.

Similar letters of reference have been applied to corresponding parts in the several figures of the drawings.

The apparatus will now be described.

The seed to be treated are first placed in a suitable tank, T, Fig. 1 of the annexed drawings. This tank is mounted upon a frame, A, which, when constructed as shown in the drawings, comprises two longitudinal sills, *o*, two top rails, *d*, two pairs of end standards, *a* and *c*, a pair of intermediate standards, *b*, and end cross-bars, *z*. The intermediate standards, *b*, are disposed centrally of the frame and are taller than the end standards. The bottom of this tank forms an obtuse angle after running horizontally about half its length, extending then obliquely to the center supports, *b*, where it is attached on both sides. In this tank the seed is thoroughly moistened by a dilute solution of nitro-hydrochloric acid containing about six per cent. of the pure acid in the proportion of one part nitric to five parts hydrochloric. It will be seen that these proportions will make the acid known as "aqua regia." After being thoroughly moistened by this solution the seed is placed in a suitable draining-vessel. I prefer to use a capillary draining-vessel especially constructed by me for the purpose, which I will hereinafter fully describe. The seed, as stated before, moist with the dilute solution of nitro-hydrochloric acid, is brought, through the aid of a conveying-belt, E, over a V-shaped capillary draining-vessel. (Marked T'.) This drainer is mounted adjoining the tank T on the frame A, between the side beams, $d$, and against the center supports, $b$, in direct connection with the tank T. This part of the apparatus consists of a wooden trough-shaped vessel provided with iron bindings. I prefer to fill the draining-vessel with a suitable porous material—such as asbestos, charcoal, or like porous substance. At the top of the vessel I place a wire screen, $o^2$, resting upon the porous material in an inclined position. From the bottom of the drainer is extended a small iron tube, $e$, leading to a force-pump, I.

The conveying-belt E, before mentioned, is provided with wire-rakes $x$, which serve to carry the seed over the inclined wire screen $o^2$. This belt is mounted upon large rollers $d^2$ and $f$, provided with suitable shafting working in journal-boxes $n$ $n'$ $m$ $m'$, attached, respectively, to the standards $b$ and the horizontal beams $d$.

To one end of the shaft of the roller $d^2$ is attached a pulley, $c^2$, which is connected by a band, $c^3$, with a driving-pulley, $b^2$, through which motion is transmitted. The roller $f$ has a pulley, $n^2$, attached to one end of the shaft, which is in connection by a band, $n^3$, with a large pulley, $h$. This pulley $h$ is provided with the necessary connection to work a force-pump, I, attached to one of the standards $b$.

The pump I is provided with a small tube, $e$, extending from the bottom of the draining-vessel T, and enters at its base. Through this tube $e$ the collected acid is drawn into the pump and forced out through the tube $k$, which extends beyond the top of the tank T, and is provided with a stop-cock, $k'$, to regulate the flow of acid, which is again used.

The moist seed conveyed by the belt E is made to slowly roll over the inclined screen $o^2$, and by the time it reaches the lowest point (marked F) is sufficiently drained to enter a brushing and drying apparatus. My process is greatly enhanced by using a brushing and drying apparatus in which the fiber of the seed is disintegrated, where the seed are freed of the reduced fiber, and where the same is also dried. I have constructed such an apparatus, consisting of a revolving wire-gauze cylinder inclosed in a suitable cylindrical case, which is heated to about 100° centigrade. The case is provided with the necessary feed and exhaust devices. In this improved apparatus the seed is simultaneously brushed and dried. The following is a full description of the same. The iron case C', mounted in an inclined position upon a suitable stand, is provided at its upper end with a fulcrumed feed-spout, L. This end is also provided with a bearing, J', bolted to the outside of the disk-shaped end plate of the case, and at the lower end a bracket-bearing, J, is attached. Extending the whole length of the case and projecting beyond the bracket-bearing is a shaft, B', one end of which rests in the bearing J', the other in the bearing J. To this shafting is attached the wire-gauze cylinder $B^2$, which consists of the iron end castings, $a^2$ $a^2$, the iron bands $a^3$, and the connecting-rods $b^2$, which form a frame over which the wire-gauze is stretched and fastened. A short distance from the upper end plate, $c^2$, the shafting is provided interiorly of the casing with a cam-wheel, $l^2$, which is attached thereto adjoining the end castings, $a^2$, of the revolving cylinder $B^2$. At the lower end the shaft is provided with a driving-pulley, G, attached outside of the bracket-bearing J. A hollow shaft, $B^3$, extends from the bracket-bearing J about one-fourth of the distance of the main shaft B', and revolves thereon in an opposite direction to that of the main shaft. To this hollow shaft, which is provided with a driving-pulley, G', a wire brush, B, with the bristles set in a spiral direction, is rigidly attached.

Entering the case C' at the upper end, $c^2$, just below the fulcrumed feed-spout L, is a heating-pipe, K, having a sufficient coil inside the casing to give the required heat. This pipe has its exit at the point marked $E^3$. Immediately above the heating-pipe K, I have attached the fulcrumed feed-spout L, the extended portion $l'$ entering the casing a suitable distance and resting on the cam $l^2$, which imparts a varying motion to the spout, whereby the seed is fed into the brushing and drying apparatus. The feed-spout is fulcrumed at a point, $r$, on the exterior of the casing. A large pipe, D, entering the casing at the lower end, is connected with an exhaust-fan, E', which causes a current of air to enter the casing at the opening at the feed and exit spouts, the current escaping through the pipe D. This current carries off all the disintegrated fiber, but does not hinder the seed from being discharged through the spout S. The moist seed enters the brushing apparatus, and, coming in contact with the element heat, aqua regia is formed, the fiber is decomposed, and after being brushed the seed is ready for the market.

Among the advantages of my process the following may be enumerated: first, the use of a much less dangerous solution than has been used heretofore; second, the elimination of the numerous water and alkaline baths; third, no acids or salts left on the seed to contaminate the same; fourth, the time required is very short, as the seed are simply moistened and then subjected to heat, when they are ready for market; fifth, the apparatus required is simple and inexpensive; sixth, the process is as cheap if not cheaper than any now employed.

I claim as my invention—

1. The process of separating fiber from cotton-seed, which consists in moistening the seed with a dilute solution of nitro-hydrochloric acid, and then subjecting the so-moistened seed to the action of heat, substantially as described.

2. The process of separating fiber from cotton-seed, which consists in moistening the seed with a dilute solution of nitro-hydrochloric acid, and then subjecting the so-moistened seed to the action of heat and finally to a brushing operation, substantially as described.

3. The process of separating fiber from cotton-seed, which consists in wetting the seed with a solution composed of nitric acid, hydrochloric acid, and water, in the proportions of about one part of nitric acid, five parts of hydrochloric acid, and ninety-four parts of water, and then subjecting the so-moistened seed to a temperature of about 100° centigrade.

4. The process of separating fiber from cotton-seed, which consists in wetting the seed with a solution composed of nitric acid, hydrochloric acid, and water, in the proportions of about one part of nitric acid, five parts of hydrochloric acid, and ninety-four parts of water, and then subjecting the so-moistened seed to a temperature of about 100° centigrade, and also to a brushing operation.

FRED C. COOPER.

Witnesses:
T. W. SCOTT,
C. O. STILLWELL.